(12) United States Patent
Van Blokland

(10) Patent No.: US 11,064,705 B2
(45) Date of Patent: Jul. 20, 2021

(54) DEVICE FOR ALIGNING DOUGH PIECES

(71) Applicant: Radie B.V., Culemborg (NL)

(72) Inventor: Johannes Josephus Antonius Van Blokland, Laren (NL)

(73) Assignee: Radie B.V.

( * ) Notice: Subject to any disclaimer, the term of this patent is extended or adjusted under 35 U.S.C. 154(b) by 0 days.

(21) Appl. No.: 16/898,060

(22) Filed: Jun. 10, 2020

(65) Prior Publication Data
US 2020/0390112 A1    Dec. 17, 2020

(30) Foreign Application Priority Data
Jun. 12, 2019   (EP) ..................................... 19179746

(51) Int. Cl.
| B65G 47/32 | (2006.01) |
|---|---|
| A21C 9/08 | (2006.01) |
| B65G 47/08 | (2006.01) |
| B65G 47/68 | (2006.01) |

(52) U.S. Cl.
CPC ............ A21C 9/085 (2013.01); B65G 47/084 (2013.01); B65G 47/32 (2013.01); B65G 47/68 (2013.01); B65G 2201/0202 (2013.01)

(58) Field of Classification Search
CPC .... B65G 47/084; B65G 47/32; B65G 47/642; B65G 47/68; B65G 47/648; B65G 47/71; B65G 2201/0205
USPC ....... 198/436, 442, 458, 572, 574, 575, 578, 198/579, 601
See application file for complete search history.

(56) References Cited

U.S. PATENT DOCUMENTS

| 1,824,413 A | * | 9/1931 | Smith .................... A24C 5/326 |
|---|---|---|---|
| | | | 198/442 |
| 2,334,384 A | * | 11/1943 | Cohen .................. B65G 47/648 |
| | | | 198/369.5 |

(Continued)

FOREIGN PATENT DOCUMENTS

| DE | 1266703 B | 4/1968 |
|---|---|---|
| DE | 3027613 A1 | 3/1981 |

(Continued)

OTHER PUBLICATIONS

The extended European search report dated Aug. 30, 2019, from European Application No. 19179746.3, 10 sheets.

*Primary Examiner* — Joseph A Dillon, Jr.
(74) *Attorney, Agent, or Firm* — Katten Muchin Rosenman LLP

(57) ABSTRACT

The present invention relates to a device for aligning dough pieces, comprising a first conveyor, for conveying dough pieces in a direction of conveyance; a second conveyor, for conveying dough pieces in the same direction of conveyance; wherein the second conveyor is arranged as an extension of the first conveyor, and there is a gap in between the first and the second conveyor; wherein a number of transfer units is arranged in parallel in the gap, each transfer unit for transferring dough pieces from the first conveyor to the second conveyor, wherein the transfer units are adapted for independently moving the dough pieces with a directional component perpendicular to the direction of conveyance during transfer from a front side adjacent to the first conveyor to a back side adjacent to the second conveyor.

20 Claims, 1 Drawing Sheet

(56) References Cited

U.S. PATENT DOCUMENTS

| | | | |
|---|---|---|---|
| 2,848,100 A * | 8/1958 | Jasper | B65G 47/648 144/242.1 |
| 2,909,267 A * | 10/1959 | Ferguson, Jr. | B65G 47/648 198/436 |
| 3,599,579 A * | 8/1971 | Paaskesen | A21C 9/085 83/107 |
| 3,896,922 A * | 7/1975 | De Jong | B65G 17/12 198/802 |
| 3,915,282 A | 10/1975 | Remensperger | |
| 3,999,648 A * | 12/1976 | Kennedy | B65G 47/71 198/437 |
| 4,779,715 A * | 10/1988 | Pazdernik | B65G 47/648 198/436 |
| 4,892,181 A | 1/1990 | Hogenkamp | |
| 4,927,000 A | 5/1990 | Hoyland et al. | |
| 5,174,430 A * | 12/1992 | Ebira | B65G 47/648 198/418.5 |
| 5,188,210 A * | 2/1993 | Malow | B65G 21/2054 198/369.5 |
| 5,516,538 A | 5/1996 | Ueno et al. | |
| 5,722,532 A * | 3/1998 | Troisi | B65G 47/682 198/440 |
| 6,152,284 A | 11/2000 | Sandberg et al. | |
| 6,276,508 B1 * | 8/2001 | Bonnet | B07C 5/362 198/348 |
| 6,460,842 B1 | 10/2002 | Koelle | |
| 6,715,600 B2 * | 4/2004 | Ronchi | B65G 47/648 198/436 |
| 6,854,586 B1 | 2/2005 | VanderMeer | B65G 37/005 198/436 |
| 6,981,582 B2 | 1/2006 | Miller et al. | |
| 7,270,227 B2 * | 9/2007 | Bender | B65G 47/648 198/358 |
| 7,275,635 B2 * | 10/2007 | Enya | B65G 37/02 198/463.2 |
| 7,461,734 B2 * | 12/2008 | Mignano | B65G 47/648 198/353 |
| 7,832,544 B2 * | 11/2010 | Kroessmann | B65G 47/648 198/442 |
| 7,963,386 B2 * | 6/2011 | Stauber | B41F 13/54 198/442 |
| 8,251,202 B2 * | 8/2012 | Edelmann | B65G 47/80 198/445 |
| 2001/0015380 A1 * | 8/2001 | Good | G06K 7/10811 235/472.02 |
| 2003/0085281 A1 * | 5/2003 | Knowles | G02B 26/10 235/454 |
| 2007/0029165 A1 * | 2/2007 | Bender | B65G 47/648 198/358 |
| 2007/0154604 A1 | 7/2007 | Pasch | |
| 2008/0264759 A1 * | 10/2008 | Mignano | B65G 47/71 198/367 |
| 2009/0139835 A1 * | 6/2009 | Christensen | B65G 47/648 198/370.03 |
| 2010/0072025 A1 * | 3/2010 | Chung | B65G 47/648 198/369.1 |
| 2011/0056797 A1 * | 3/2011 | Tsai | B65H 31/3009 198/374 |
| 2012/0031734 A1 | 2/2012 | Kitagawa et al. | |
| 2012/0294964 A1 | 11/2012 | Piller | |
| 2013/0105275 A1 * | 5/2013 | Lim | B65G 47/644 198/369.1 |
| 2016/0046452 A1 * | 2/2016 | Parker | B65G 47/71 198/442 |
| 2017/0144840 A1 * | 5/2017 | Fujio | B65G 15/60 |
| 2018/0093836 A1 * | 4/2018 | Rabec | B65G 47/26 |

FOREIGN PATENT DOCUMENTS

| | | |
|---|---|---|
| EP | 2502859 A1 | 9/2012 |
| JP | 2006021916 A | 1/2006 |
| KR | 20100051968 A | 5/2010 |

* cited by examiner

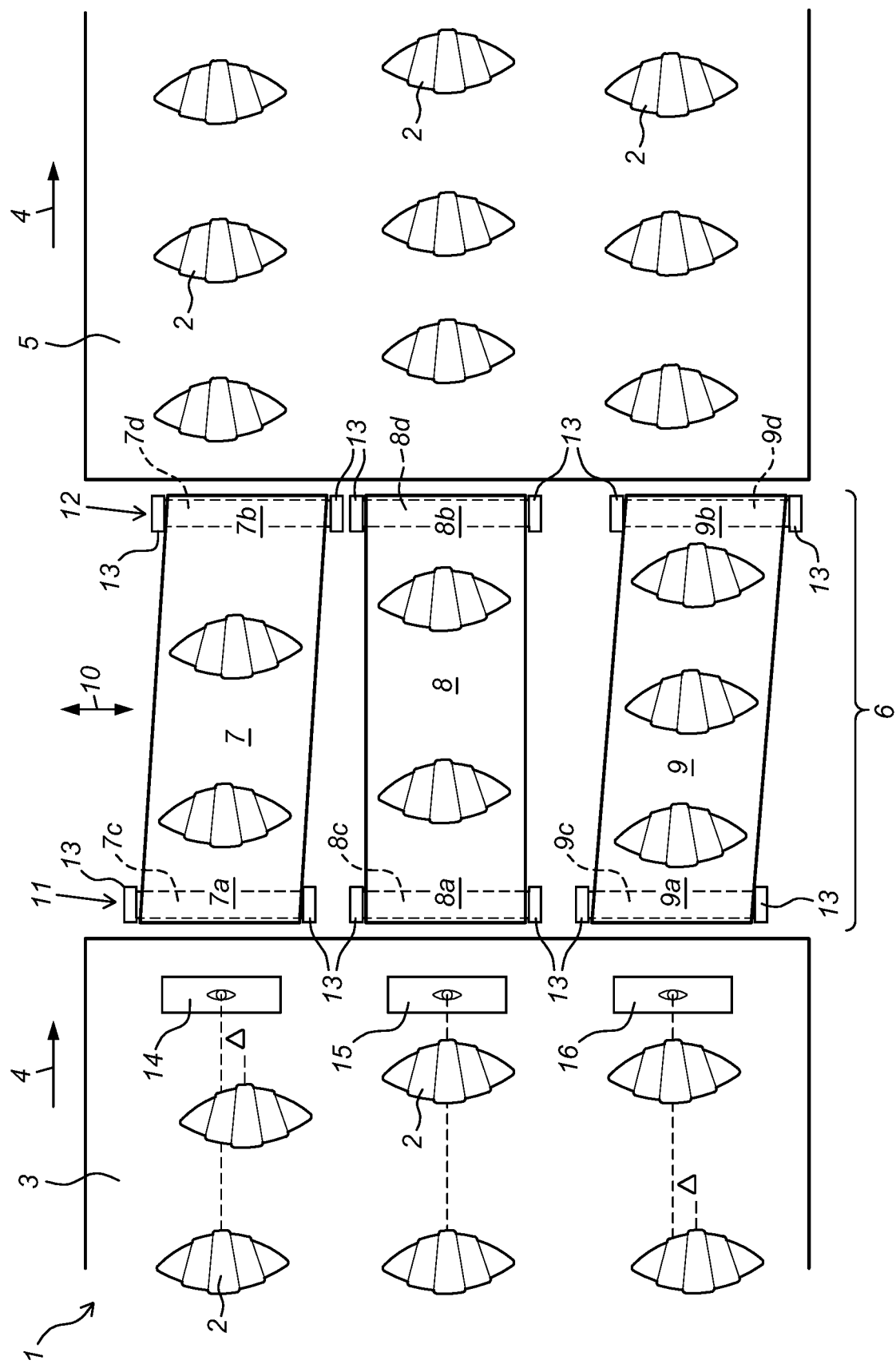

DEVICE FOR ALIGNING DOUGH PIECES

CROSS-REFERENCE TO RELATED APPLICATIONS

This application claims priority of European Patent Application Number 19179746.3, filed on Jun. 12, 2019 in European Patent Office, and herein incorporated by reference in its entirety.

TECHNICAL FIELD

The present invention relates to a device for aligning dough pieces. More in particular, the invention relates to a device for aligning dough pieces that are conveyed in parallel lanes on a conveyor, wherein the alignment takes place with at least a transverse direction perpendicular to a direction of conveyance.

BACKGROUND

Devices for aligning dough pieces that are conveyed in a lane or in multiple parallel lanes are known in the art. A first example is given in the U.S. Pat. No. 3,915,282, which describes a device for aligning dough pieces that are conveyed in a lane on a conveyor. The device is able to move dough pieces in a direction perpendicular to the direction of conveyance. However, only a single line of dough pieces can be handled by the device.

The U.S. Pat. No. 6,981,582 describes a device for aligning dough pieces that are conveyed in multiple lanes on a conveyor. However, this device can only align multiple dough pieces in different lanes all together, which requires that they are already in line in the direction perpendicular to the direction of conveyance, and can only be moved all over the same distance.

Also patent publications U.S. Pat. No. 4,927,000, DE1, 266,703 and U.S. Pat. No. 6,152,284 disclose a device wherein the movement of one transfer unit is restricted by the movement of another transfer unit, but none of these documents discloses a device wherein "each transfer belt is at least at its front side and/or its back side movable in a direction perpendicular to the direction of conveyance, independent from transfer belts of other transfer units".

It is a goal of the present invention to provide a system for aligning dough pieces that are transported in parallel lanes on a conveyor, wherein there is no requirement for the dough pieces to be in line in a direction perpendicular to the direction of conveyance, and wherein dough pieces in different lanes can be aligned independent of each other.

SUMMARY

The invention thereto proposes a device for aligning dough pieces, comprising a first conveyor, for conveying dough pieces in a direction of conveyance, a second conveyor, for conveying dough pieces in the same direction of conveyance wherein the second conveyor is arranged as an extension of the first conveyor, wherein there is a gap in between the first and the second conveyor in which a number of transfer units is arranged in parallel, each transfer unit for transferring dough pieces from the first conveyor to the second conveyor, wherein the transfer units are adapted for independently moving the dough pieces with a directional component perpendicular to the direction of conveyance during transfer from a front side adjacent to the first conveyor to a back side adjacent to the second conveyor.

The device according to the present invention is able to independently align dough pieces that are conveyed on multiple lanes on the first conveyor. The device sets no requirement to a synchronous arrival of dough pieces in different lanes at the transfer units, and it allows to align each dough piece separately with respect to the lane it is conveyed in.

In an embodiment of the present invention, the device comprises at least one transfer unit which is at its front side and/or at its back side independently movable perpendicular to the direction of conveyance. This allows to either move the front side for receiving a dough piece that has a misalignment in the center of the transfer unit, or to move the back side for delivering a dough piece decentral on the transfer unit and to deliver it aligned with its lane at the second conveyor.

The transfer units may for instance comprise a number of endless cords that are arranged next to each other, but preferably the transfer units each comprise a transfer belt, wherein each transfer belt is at least at its front side or at its back side movable in a direction perpendicular to the direction of conveyance, independent from transfer belts of other transfer units. In a further embodiment, the front side and back side are independently movable from each other as well.

The transfer units may in a practical embodiment each comprise at least a roller at their front side and at least a roller at their back side, wherein the transfer belt is looped around the at least one roller at the front side and the at least one roller at the back side, wherein for each transfer unit the roller at the front side and/or the roller at the back side is independently movable in a direction perpendicular to the direction of conveyance. Alternatively, the transfer units may have one roller, and one fixed nose bar, which may in particular be a sharp nose bar. To avoid that the transfer belt slips or slides off the rollers, at least the roller at the front side or the roller at the back side may be provided with at least one flange for guiding the transfer belt. In case of one flange, this may be a flange with a smaller thickness than the thickness of the belt, and the belt may have a corresponding groove. The rollers may also be provided with two flanges, that are arranged next to the transfer belt, to keep the transfer belt in between them.

Alternatively, the transfer belt may be provided with at least one local thickening, such as a cord, and both rollers are provided with at least one recess for receiving said at least one thickening. The thickening then follows the recess in the roller, also when the roller is moved perpendicular to the direction of conveyance. Since the length of the path the transfer belt has to follow changes when the front roller and back roller are more or less aligned, the transfer belt may be chosen to comprise an elastic material. Alternatively, a tensioner may be present between the front or the back roller of the transfer unit.

In a further embodiment of the device according to the invention, there is a number of measurement units, each for determining a deviation in the width direction of the position of a dough piece with respect to a predetermined position on the first conveyor and for providing measurement data, a controller, for controlling the transfer units to move the dough pieces with a directional component perpendicular to the direction of conveyance during transfer, based on the measurement data from the measurement units, to compensate the deviation. Herewith, a correct alignment may be obtained for each dough piece in each lane, automatically. The measurement unit may comprise for instance a scanner or a camera, and the controller may comprise an image processor, for indicating the amount of deviation to be corrected. The controller may be configured for, based on that indication, moving the front side of a transfer unit corresponding to a lane in which a dough piece is transported on the first conveyor in the same direction and over the same distance as a deviation that was detected for the dough piece. The controller may then be configured for moving the transfer unit before, and in particular right before a dough piece reaches the transfer unit. In that case, a high rate of transferred dough pieces can be obtained, since a subsequent dough piece can be received on the transfer device before a previous has left the device.

Alternatively or additionally, the controller may be configured for moving the back side of a transfer unit corresponding to a lane in which a dough piece is transported on the first conveyor in the opposite direction and over the same distance as a deviation that was detected for the dough piece. In that case, the controller may be configured for moving the transfer unit before a dough piece leaves the transfer unit.

In a further embodiment of the present invention, the second conveyor comprises fixation means, such as a wheel arranged above the conveyor surface, for fixating dough pieces at their position with respect to the conveyor.

In a further aspect of the present invention, multiple devices for aligning dough pieces according to the present invention may be arranged in series, or multiple transfer units may be placed in series.

BRIEF DESCRIPTION OF THE DRAWINGS

The invention will now be elucidated with respect to FIG. 1, wherein:

FIG. 1 shows a schematic top view of a device according to the present invention.

DETAILED DESCRIPTION

FIG. 1 shows a schematic top view of a device 1 for aligning dough pieces 2, comprising a first conveyor 3, for conveying dough pieces 2 in a direction of conveyance 4, a second conveyor 5, for conveying dough pieces in the same direction of conveyance wherein the second conveyor 5 is arranged as an extension of the first conveyor, and there is a gap 6 in between the first and the second conveyor 3, 5. Furthermore there is a number of transfer units 7, 8, 9 arranged in parallel in the gap 6, each transfer unit 7, 8, 9 for transferring dough pieces 2 from the first conveyor 3 to the second conveyor 5, wherein the transfer units 7, 8, 9 are adapted for independently moving the dough pieces 2 with a directional component 10 perpendicular to the direction of conveyance 4 during transfer from a front side 11 adjacent to the first conveyor to a back side 12 adjacent to the second conveyor.

The transfer units 7, 8, 9 are at their front side 7a, 8a, 9a and/or back side 7b, 8b, 9b independently movable perpendicular to the direction of conveyance. The transfer units 7, 8, 9 each comprise a transfer belt 7, 8, 9, wherein each transfer belt is at least at its front side or at its back side movable in a direction perpendicular to the direction of conveyance, independent from transfer belts 7, 8, 9 of other transfer units.

In the depicted embodiment, the transfer units each comprise a roller at their front side 7c, 8c, 9c and a roller at their back side 7d, 8d, 9d, wherein the transfer belt 7, 8, 9 is looped around the at least one roller at the front side and the at least one roller at the back side, wherein for each transfer unit the roller at the front side and/or the roller at the back side is independently movable in a direction perpendicular to the direction of conveyance. The rollers are provided with flanges 13 for guiding the transfer belt.

The device further comprises a number of measurement units 14, 15, 16, each for determining a deviation DELTA ($\Delta$) in the width direction of the position of a dough piece 2 with respect to a predetermined position on the first conveyor 3; and for providing measurement data, which is then delivered to a controller (not depicted), for controlling the transfer units 7, 8, 9 to move the dough pieces 2 with a directional component 10 perpendicular to the direction of conveyance 4 during transfer, based on the measurement data from the measurement units 14, 15, 16, to compensate for the deviation DELTA. Measurement units 14, 15, 16 are depicted as separate devices here, but they may also be integrated in a single device, such as a line scanner device.

What is claimed is:

1. A device for aligning dough pieces, comprising:
   a first conveyor for conveying dough pieces in a direction of conveyance;
   a second conveyor for conveying dough pieces in the same direction of conveyance, wherein the second conveyor is arranged as an extension of the first conveyor and there is a gap in between the first and the second conveyors; and
   one or more transfer units arranged in parallel in the gap, each transfer unit for transferring dough pieces from the first conveyor to the second conveyor,
   wherein:
   each of the one or more transfer units are adapted for independently moving the dough pieces with a directional component perpendicular to the direction of conveyance during transfer from a front side adjacent to the first conveyor to a back side adjacent to the second conveyor,
   each of the one or more transfer units comprise a transfer belt, wherein each transfer belt is at least at its front side and/or at its back side movable in a direction perpendicular to the direction of conveyance, independent from transfer belts of other transfer units, and
   each of the one or more transfer units comprise at least one roller at their front side and at least one roller at their back side, wherein the transfer belt is looped around the at least one roller at the front side and the at least one roller at the back side, wherein for each transfer unit the roller at the front side and/or the roller at the back side is independently movable in a direction perpendicular to the direction of conveyance.

2. The device according to claim 1, wherein at least the roller at the front side or the roller at the back side is provided with at least one flange for guiding the transfer belt.

3. The device according to claim 1, wherein the transfer belt is provided with at least one local thickening and both rollers are provided with at least one recess for receiving said at least one thickening.

4. The device according to claim 1, wherein at least one transfer belt is elastic.

5. The device according to claim 1, further comprising:
   at least one measurement unit for determining a deviation (DELTA) in the width direction of the position of a dough piece with respect to a predetermined position on the first conveyor and for providing measurement data; and
   a controller for controlling the transfer units to move the dough pieces with a directional component perpendicular to the direction of conveyance during transfer, based on the measurement data from the measurement units, to compensate for the deviation (DELTA).

6. The device according to claim 5, wherein a measurement unit comprises a scanner or a camera, and wherein the controller comprises an image processor.

7. The device according to claim 6, wherein the image processor indicates the amount of deviation (DELTA) to be corrected.

8. The device according to claim 5, wherein the controller is configured for moving the front side of a transfer unit corresponding to a lane in which a dough piece is transported on the first conveyor in the same direction and over the same distance as a deviation (DELTA) that was detected for the dough piece.

9. The device according to claim 8, wherein the controller is configured for moving the transfer unit before a dough piece reaches the transfer unit.

10. The device according to claim 7, wherein the controller is configured for moving the back side of a transfer unit corresponding to a lane in which a dough piece is transported on the first conveyor in the opposite direction and over the same distance as a deviation (DELTA) that was detected for the dough piece.

11. The device according to claim 10, wherein the controller is configured for moving the transfer unit before a dough piece leaves the transfer unit.

12. The device according to claim 1, wherein the second conveyor comprises a fixator, including a wheel arranged above the conveyor surface, for fixating dough pieces at their position with respect to the conveyor.

13. A system for aligning dough pieces comprising a plurality of devices according to claim 1 arranged in a series.

14. A system for aligning dough pieces comprising a plurality of devices arranged in a series, wherein each of the devices comprises:
   a first conveyor for conveying dough pieces in a direction of conveyance;
   a second conveyor for conveying dough pieces in the same direction of conveyance, wherein the second conveyor is arranged as an extension of the first conveyor and there is a gap in between the first and the second conveyors; and
   a plurality of transfer units arranged in parallel in the gap, each transfer unit for transferring dough pieces from the first conveyor to the second conveyor,
   wherein:
   each of the plurality of transfer units are adapted for independently moving the dough pieces with a directional component perpendicular to the direction of conveyance during transfer from a front side adjacent to the first conveyor to a back side adjacent to the second conveyor,
   each of the plurality of transfer units comprise a transfer belt, wherein each transfer belt is at least at its front side and/or at its back side movable in a direction perpendicular to the direction of conveyance, independent from transfer belts of other transfer units, and
   each of the plurality of transfer units comprise at least one roller at their front side and at least one roller at their back side, wherein the transfer belt is looped around the at least one roller at the front side and the at least one roller at the back side, wherein for each transfer unit the roller at the front side and/or the roller at the back side is independently movable in a direction perpendicular to the direction of conveyance.

15. The system according to claim 14, wherein at least the roller at the front side or the roller at the back side of one or more of the plurality of devices is provided with at least one flange for guiding the transfer belt.

16. The system according to claim 14, wherein the transfer belt of one or more of the plurality of devices is provided with at least one local thickening and both rollers of one or more of the plurality of devices are provided with at least one recess for receiving said at least one thickening.

17. The system according to claim 14, wherein at least one transfer belt of one or more of the plurality of devices is elastic.

18. The system according to claim 14, wherein one or more of the plurality of devices further comprises:
   at least one measurement unit for determining a deviation (DELTA) in the width direction of the position of a dough piece with respect to a predetermined position on the first conveyor and for providing measurement data; and
   a controller for controlling the plurality of transfer units to move the dough pieces with a directional component perpendicular to the direction of conveyance during transfer, based on the measurement data from the measurement units, to compensate for the deviation (DELTA).

19. The device according to claim 3, wherein the at least one local thickening includes a cord.

20. The system according to claim 16, wherein the at least one local thickening includes a cord.

* * * * *